United States Patent [19]

Wakabayashi et al.

[11] Patent Number: 5,198,872
[45] Date of Patent: Mar. 30, 1993

[54] APPARATUS FOR DETECTING THE WAVELENGTH OF LASER LIGHT

[75] Inventors: Osamu Wakabayashi; Masahiko Kowaka; Yukio Kobayashi, all of Kanagawa, Japan

[73] Assignee: Kabushiki Kaisha Komatsu Seisakusho, Tokyo, Japan

[21] Appl. No.: 640,431

[22] PCT Filed: May 18, 1990

[86] PCT No.: PCT/JP90/00640

§ 371 Date: Apr. 22, 1991

§ 102(e) Date: Apr. 22, 1991

[87] PCT Pub. No.: WO90/14582

PCT Pub. Date: Nov. 29, 1990

[30] Foreign Application Priority Data

May 23, 1989 [JP] Japan ............................ 1-129393

[51] Int. Cl.[5] ............................................. G01B 9/02
[52] U.S. Cl. .................................... 356/352; 356/346
[58] Field of Search .................. 356/346, 352; 372/32

[56] References Cited

U.S. PATENT DOCUMENTS 4,914,662 4/1990 Nakatani et al. ................ 372/32

FOREIGN PATENT DOCUMENTS 57-19992 12/1982 Japan .
60-21783 6/1985 Japan .
63-107177 5/1988 Japan .
1-183873 7/1989 Japan .

*Primary Examiner*—Samuel A. Turner
*Attorney, Agent, or Firm*—Ron Fish

[57] ABSTRACT

The present invention provides a wavelength detecting apparatus for detecting the wavelength of a light (11) to be detected with reference to a reference light (31) by allowing the reference light (31) generated and transmitted from a light source (30) and the light (11) to be detected to be irradiated toward an etalon (62) and then detecting the light which has permeated through the etalon (62) by optical detecting means (64). The reference light and the light to be detected are incident on the focusing surface (50) which is located in front of a collimeter lens (61). The incident light is transformed into a parallel light in the collimeter lens (61) and the parallel light is then irradiated toward the etalon (62). The reference light and the light to be detected both of which have permeated through the etalon (62) reach the detecting surface of optical detecting means to build their images thereon with the aid of image building lens means (63), whereby interference fringes corresponding to the reference light and the light to be detected are formed on the detecting surface of the optical detecting means. The optical detecting means detects a relative wavelength of the light to be detected relative to the reference light, i.e., an absolute wavelength of the light to be detected by detecting the interference fringes.

12 Claims, 8 Drawing Sheets

APPARATUS FOR DETECTING THE WAVELENGTH OF LASER LIGHT

TECHNICAL FIELD

The present invention relates generally to a wavelength detecting apparatus which is employed for detecting the wavelength of a laser light. More particularly, the present invention relates to a wavelength detecting apparatus which is preferably employable for detecting the wavelength of an excimer laser light especially in the case where an excimer laser light unit is installed as a light source for an equipment for projecting and exposing an image in a reduced scale wherein the equipment is installed for producing semiconductor devices.

BACKGROUND ART

Attention has been paid to employment of an excimer laser light unit as a light source for an equipment for projecting and exposing an image in a reduced scale (hereinafter referred to as a stepper) wherein the stepper is installed for producing semiconductor devices. The reason for employment of the excimer laser light unit consists in that many significant advantages can be expected from the employment of the excimer laser light unit based on the fact that an excimer laser light has a short wavelength (e.g., about 248.4 nm in the case of a KrF laser light), one of the foregoing advantages being the presence of a possibility that a limit of light exposure is extensively set to the range shorter than 0.5 micron, other one being such that the unit has a deep focus compared with the conventional mercury lamp including a g line and an i line on the assumption that they have a same resolution, respectively, another one being such that the unit has a small number of lens apertures (NA), another one being such that the exposure range can be enlarged and further another one being such that the unit can generate a large magnitude of power.

Since the excimer laser light has a short wavelength of 248.4 nm, only a quartz, $CaF_2$, $MaF_2$ or the like material are available as a material employable for permitting the laser light having the foregoing wavelength to permeate therethrough. In this connection, it should be added that the quartz only can be employed as a raw material for lenses due to various restrictions associated with optical uniformity, working accuracy and others. This makes it very difficult to design a lens employable for projecting an image in a reduced scale with its chromatic aberration corrected properly. For the reason, in the case where the excimer laser light unit is used as a light source for the stepper, there is a need of restricting the use of a laser light outputted from the excimer laser light unit within the narrow-band range to such an extent that the chromatic aberration may be neglected and moreover stably controlling the wavelength of an output laser light within the narrow-band range with a high accuracy.

A monitor etalon has been heretofore used for measuring or detecting the wavelength of an output light from an excimer laser light unit adapted to oscillate within the narrow-band range. The monitor etalon is constructed by using an air gap type etalon comprising a pair of partially refractive mirrors arranged opposite to each other with a predetermined gap therebetween. Here, the wavelength of a light to permeate through the air gap type etalon is expressed by the following equation.

$$m\lambda 2n\, d \cos \theta$$

where m designates a certain integral, d designates a distance between the partially refractive mirrors constituting the etalon, n designates a refractive index between the partially refractive mirrors and $\theta$ designates an angle defined by a normal line of the etalon and an optical axis of the incident light.

As is apparent from the equation, the angle $\theta$ varies corresponding to variation of the wavelength, provided that n, d and m are constant, respectively. The monitor etalon is used to detect the wavelength of a light to be detected by utilizing the characteristic nature as mentioned above. With respect to the above-described monitor etalon, it has been found that as the pressure within the air gap and the environmental temperature vary, the angle $\theta$ varies correspondingly even through the wavelength is kept constant. Thus, in the case where the monitor etalon is used, the wavelength is detected while the pressure within the air gap and the environmental temperature are controlled such that they are kept constant.

In practice, however, it is difficult to control the pressure within the air gap and the environmental temperature with a high accuracy. This makes it impossible to detect the absolute wavelength of a light with a sufficiently high accuracy.

To obviate the above problem, a proposal has been made with respect to an apparatus for detecting the absolute wavelength of a light to be detected by allowing a reference light of which wavelength is previously known to be inputted into the monitor etalon together with the light to be detected and then detecting a relative wavelength of the light to be detected relative to the reference light. However, in the case where a light source for the reference light and a light source for the light to be detected are different from each other in respect of their characteristic nature, e.g., in the case where a light source for the reference light is a mercury lamp which may be considered as a plane light source and a light source for the light to be detected is an excimer laser light unit, it is difficult for the reference light and the light to be detected to be introduced into the monitor etalon with a sufficiently high intensity, causing a ratio of S/N to be degraded. This makes it impossible to detect an absolute wavelength of the light to be detected with a high accuracy.

In the case where the apparatus for detecting the absolute wavelength of a light to be detected is constructed by allowing a reference light of which wavelength is previously known to be introduced into a monitor etalon together with the light to be detected to detect a relative wavelength of the light to be detected relative to the reference light and then detect an absolute wavelength of the light to be detected with reference to the detected relative wavelength in the above-described manner, when a light source for the reference light and a light source for the light to be detected are different from each other in respect of their characteristic nature, it becomes difficult that the reference light and the light to be detected are introduced into the monitor etalon with a sufficiently high intensity, respectively, resulting in the absolute wavelength of the light to be detected failing to be detected with a high accuracy.

The present invention has been made with the foregoing background in mind.

Therefore, an object of the present invention is to provide a wavelength detecting apparatus which assures that a reference light and a light to be detected can be introduced thereinto with a sufficiently high intensity even though a light source for the reference light and a light source for the light to be detected are different from each other in respect of their characteristic nature, whereby a wavelength of the light to be detected can be detected with a high accuracy.

DISCLOSURE OF THE INVENTION

To accomplish the above object, the present invention provides a wavelength detecting apparatus for detecting the wavelength of a light to be detected with reference to a reference light by allowing the reference light generated and transmitted from a light source for the reference light and the light to be detected to be irradiated toward an etalon and then detecting the light which has permeated through the etalon by optical detecting means, wherein the apparatus comprises collimeter lens means arranged at the preceding stage relative to the etalon so as to allow the light which has been irradiated toward the etalon to be transformed into a parallel light, illuminating means for allowing the focusing surface in front of the collimeter lens means to be illuminated with the reference light and the light to be detected, and image building means arranged at the subsequent stage relative to the etalon so as to allow the image indicative of the light which has permeated through the etalon to be built on the detecting surface of the optical detecting means.

According to the present invention, the focusing surface in front of a collimeter lens is illuminated with the reference light and the light to be detected. The both lights are transformed into a parallel light in the collimeter lens and the parallel light is then irradiated toward the etalon. Images indicative of the reference light and the light to be detected both of which have permeated through the etalon are built on the detecting surface of the optical detecting means with the aid of the image building lens means, whereby interference fringes corresponding to the reference light and the light to be detected are formed on the detecting surface of the optical detecting means. Consequently, the optical detecting means detects a relative wavelength of the light to be detected relative to the reference light, i.e., an absolute wavelength of the light to be detected by detecting the interference fringes which have been formed on the detecting surface of the optical detecting means.

BEST MODE FOR CARRYING OUT THE INVENTION

Now, the present invention will be described in detail hereinafter with reference to the accompanying drawings each of which illustrates a wavelength measuring apparatus in accordance with a preferred embodiment of the present invention.

Figure 1:
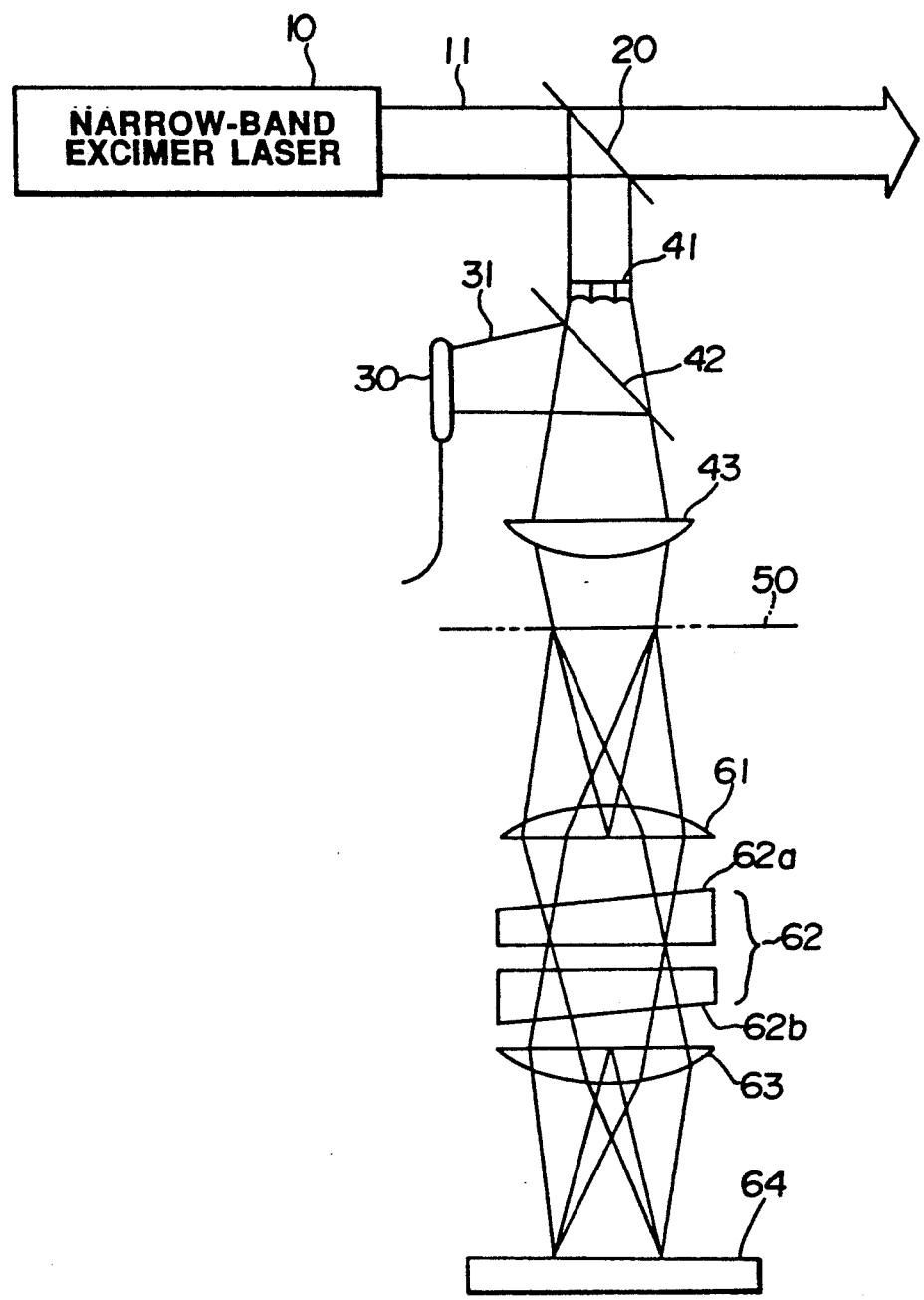
FIG. 1 is an illustrative view which schematically shows the structure of a wavelength detecting apparatus in accordance with an embodiment of the present invention wherein the apparatus is employed for detecting the wavelength of a laser light outputted from a narrow-band excimer laser unit.

FIG. 1 is an illustrative view which schematically shows the structure of a wavelength measuring apparatus in accordance with an embodiment of the present invention. According to this embodiment, a light 11 outputted from an excimer laser light unit 10 adapted to oscillate within the narrow-band range is used for the apparatus and a mercury lamp is employed as a light source 30 for generating a reference light. In the case of the shown embodiment, the light to be detected is a KrF excimer laser light having a wavelength of 248.4 nm and the reference light outputted from the mercury lamp 30 has a wavelength of 253.7 nm.

A part of the laser light 11 outputted from the excimer laser light unit 10 is deflected sideward of a beam splitter 20 for the purpose of sampling and the sampling light is then irradiated toward a beam splitter 42 via an integrator 41. On the other hand, the reference light 31 outputted from the light source 30 is irradiated toward the opposite surface of the beam splitter 42.

The beam splitter 42 serves to allow a part of the sampling light outputted from the integrator 41 to permeate therethrough. In addition, the beam splitter 42 serves to allow a part of the reference light 31 outputted from the light source 30 to be reflected therefrom. With this construction, the sampling light and the reference light are united with each other. The resultant composite light composed of the sampling light and the reference light with the aid of the beam splitter 42 is incident on a focusing surface 50 in front of a collimeter lens 61 via a condensor lens 43. The collimeter lens 61 serves to transform into a parallel light the light which has been incident on the focusing surface 50 in front of the collimeter lens 61, and the parallel light is then incident on an etalon 62.

The etalon 62 is composed of two transparent plates 62a and 62b each of which inside surface serves as a partially refractive mirror so as to allow the light which has permeated therethrough to have a different wavelength corresponding to the angle of an incident light on the etalon 62. The light which has permeated through the etalon 62 is irradiated toward an optical position detector 64 via an image building lens 63, whereby a first interference fringe is formed on the detecting surface of the optical detector 64 corresponding to the wavelength of the reference light and moreover a second interference fringe is likewise formed on the detecting surface of the optical detector 64 corresponding to the wavelength of the light to be detected. Thus, the optical detector 64 serves to detect the first and second interference fringes. On detection of the first and second interference fringes, the optical detector 64 detects a relative wavelength of the light to be detected relative to the wavelength of the reference light. Then, the optical detector 64 detects an absolute wavelength of the light to be detected based on the known wavelength of the reference light and the relative wavelength which has been detected in that way.

It should be noted that the optical detector 64 can be constructed by using a single dimensional or two-dimensional image sensor, diode array, PSD (position sensitive detector) or the like device.

With such construction, an interference fringe having a high optical intensity can be obtained with the result that an absolute wavelength of the light to be detected can be detected with a high accuracy. Since it is required that the reference light and the light to be detected illuminate the focusing surface only which is located in front of the collimeter lens, there is no need of allow their optical axes to align with each other with a high accuracy. This makes it very easy to carry out adjustment with respect to the optical axes.

Figure 2:
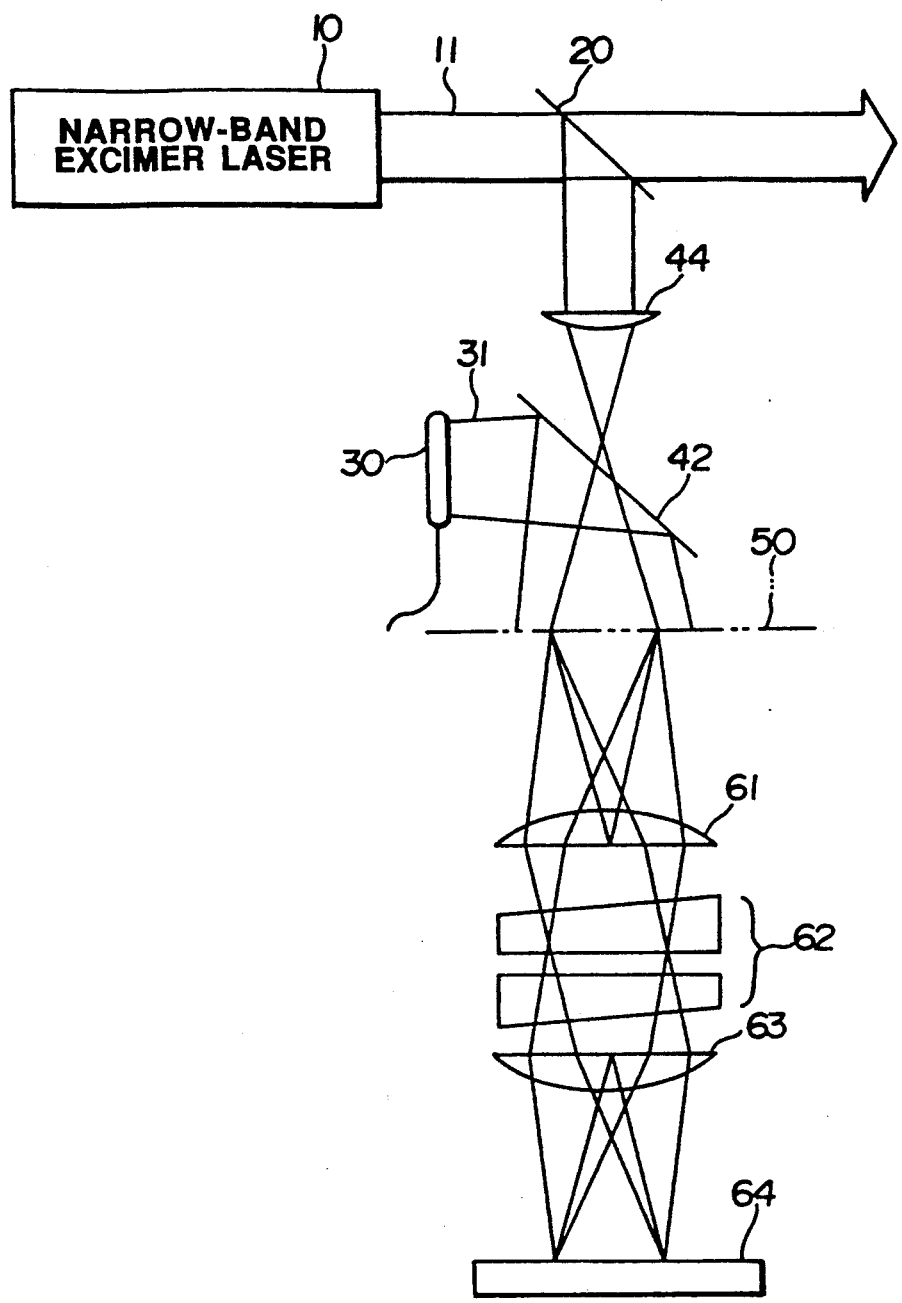
FIG. 2 is an illustrative view which schematically shows the structure of a wavelength detecting apparatus in accordance with other embodiment of the present invention wherein a light collecting lens is employed for the apparatus.

FIG. 2 is an illustrative view which schematically illustrates the structure of a wavelength detecting apparatus in accordance with other embodiment of the present invention. For the convenience of simplfication of illustration, same or similar components in FIG. 1 to those shown in FIG. 2 and the subsequent drawings in respect of their function are hereinafter represented by same reference numerals.

According to the embodiment shown in FIG. 2, a part of the light to be detected is deflected sideward of the beam splitter 20 for the purpose of sampling, and the sampling light is then collected by a collecting lens 44. Thereafter, the collected light permeates through a beam splitter 42 to illuminate a focusing surface 50 in front of a collimeter lens 61 with the light which has permeated through the beam splitter 42. On the other hand, the reference light 31 generated and transmitted from the light source 30 is reflected at the beam splitter 42 to likewise illuminate the focusing surface 50 in front of the collimeter lens 61 with the reflected reference light. With this construction, the focusing surface 50 in front of the collimeter lens 61 is illuminated with the both lights, i.e., the light to be detected and the reference light. The resultant illuminating light is collimated by the collimeter lens 61 to form two interference fringes on the detecting surface of an optical detector 64 via an image building lens 63, one of them being an interference fringe corresponding to the reference light and the other one being an interference fringe corresponding to the light to be detected. Consequently, an absolute wavelength of the light to be detected can be detected with reference to the two interference fringes which have been formed in the above-described manner.

Figure 3:
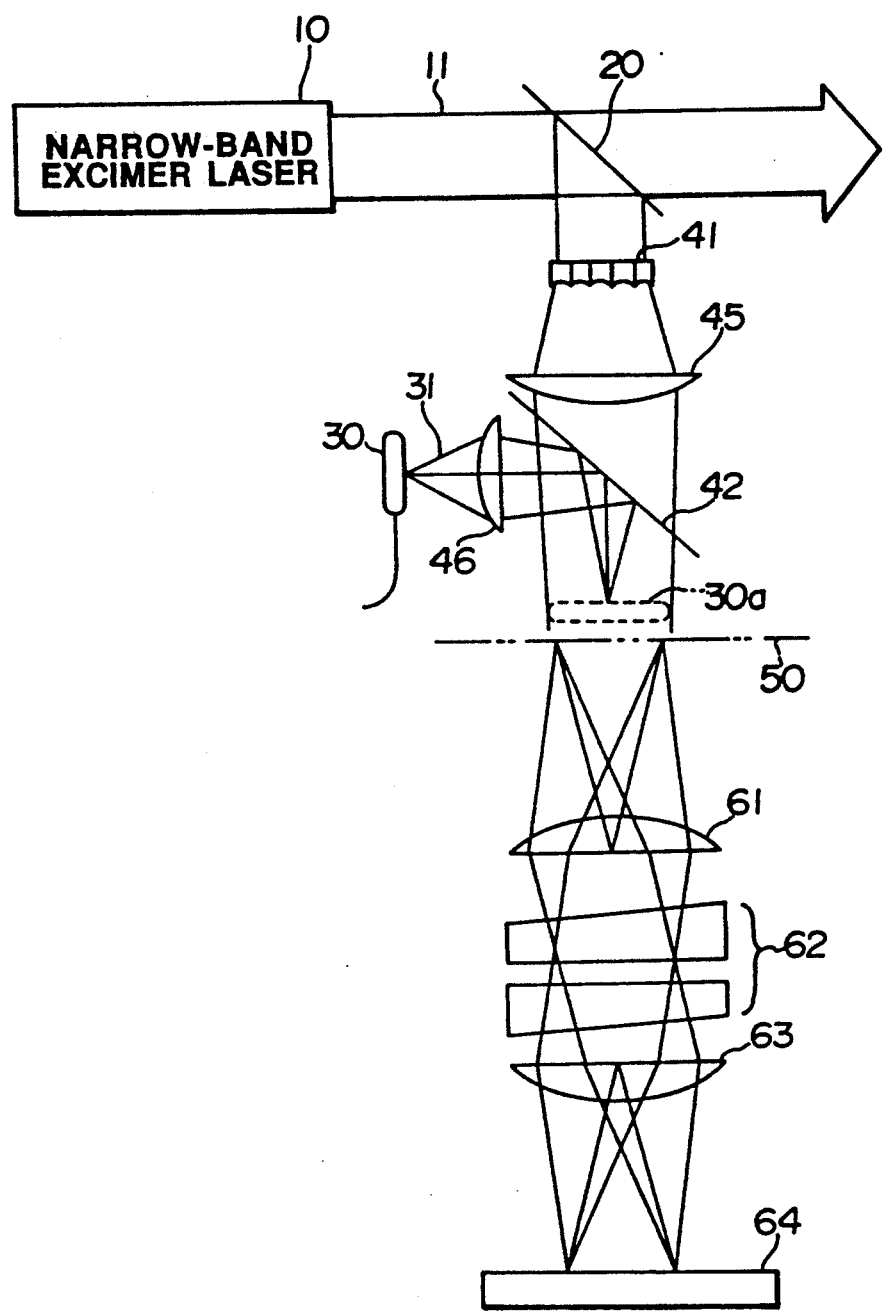
FIG. 3 is an illustrative view which schematically shows the structure of a wavelength detecting apparatus in accordance with another embodiment of the present invention wherein an image indicative of a light source for a reference light is built in the region upstream of the focusing surface which is located in front of a collimeter lens.

FIG. 3 is an illustrative view which schematically shows the structure of a wavelength detecting apparatus in accordance with another embodiment of the present invention. According to this embodiment, a part of the light to be detected is deflected sideward of the beam splitter 20 for the purpose of sampling, and the sampling light is then incident on a beam splitter 42 via an integrator 41 and a light collecting lens 45 to illuminate a focusing surface 50 in front of a collimeter lens 61 with the light which has permeated through the beam splitter 42.

On the other hand, the reference light 31 which has been generated and transmitted from the light source 30 permeates through an image building lens 46 and is then reflected at the beam splitter 42 to build an image 30a indicative of the light source 30 for the light source in the region upstream of the focusing surface 50 in front of the collimeter lens 61.

Such construction is substantially equivalent to the construction wherein the light source 30 for the reference light is arranged at the image 30a indicative of the light source for the reference light. This means that the focusing surface in front of the collimeter lens 61 is illuminated with the light to be detected which has been collected by the light collecting lens 45 as well as the reference light from the image 30a indicative of the light source 30 for the reference light. It should be added that the subsequent operations are same to those shown and described above with reference to FIG. 1 and FIG. 2.

With such construction, the focusing surface 50 in front of the collimeter lens 61 can effectively be illuminated with a small quantity of the light transmitted from the light source 30 for the reference light. Especially, an optical intensity of the interference fringe derived from the reference light can be enlarged.

Figure 4:
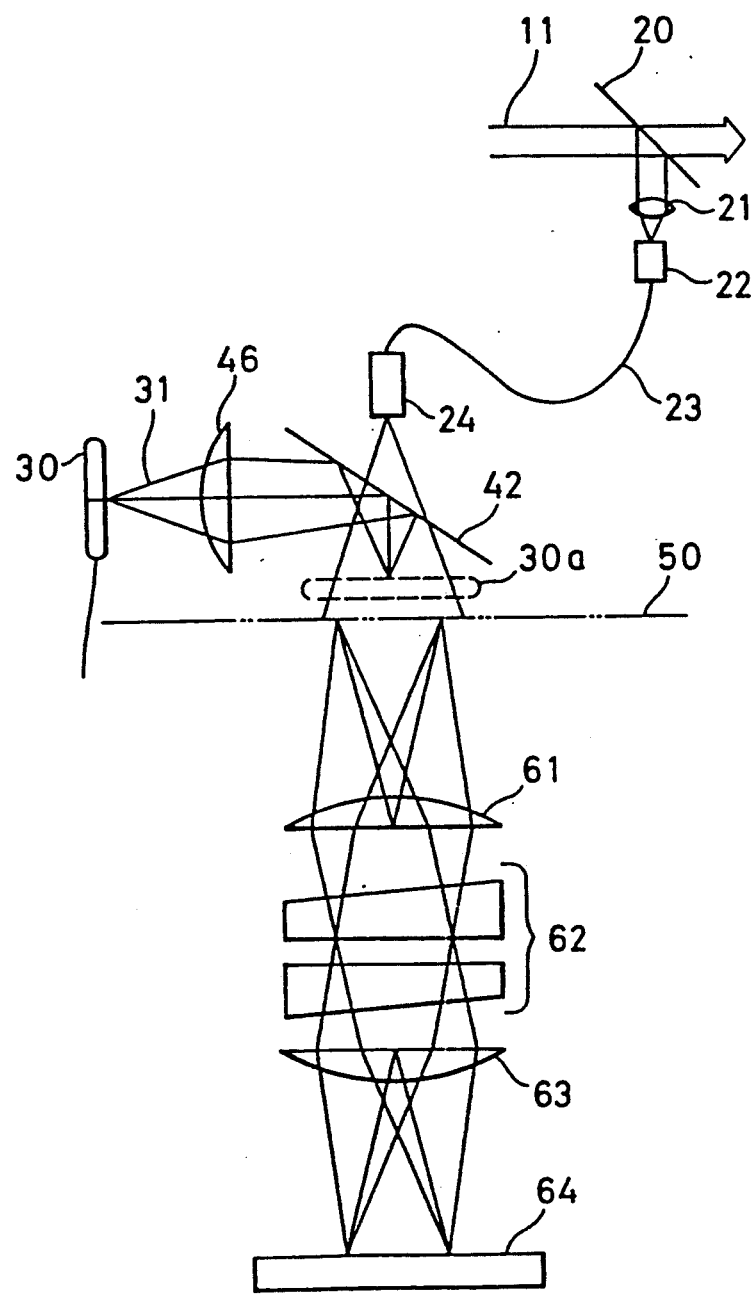
FIG. 4 is an illustrative view which schematically shows the structure of a wavelength detecting apparatus in accordance with another embodiment of the present invention wherein a light to be detected is introduced into an optical detecting system via an optical fiber.

FIG. 4 is an illustrative view which schematically shows the structure of a wavelength measuring apparatus in accordance with another embodiment of the present invention wherein the light to be detected which has been deviated from the beam splitter 20 for the purpose of sampling is introduced into an optical detecting system. According to this embodiment, a part of the light to be detected which has been deflected from the beam splitter 20 for the purpose of sampling is inputted into an optical fiber 23 via a lens 21 and a sleeve 22. Then, the light to be detected which has been transmitted through the optical fiber 23 is outputted via a sleeve 24 to illuminate a beam splitter 42 with the light which has been outputted from the sleeve 24. Thereafter, the focusing surface 50 in front of a collimeter lens 61 is illuminated with the light which has permeated through the beam splitter 42. Other construction rather than the aforementioned one is identical to that shown in FIG. 3. Thus, repeated description will not be required.

With such construction, since the light to be detected is transmitted through the optical fiber 23, the positional relationship between the position of the excimer laser light 11 to be detected and the position of the wavelength detecting apparatus can be predetermined arbitrarily. This leads to an advantage that the position where the wavelength detecting apparatus has been arranged is not strictly restricted.

Figure 5:
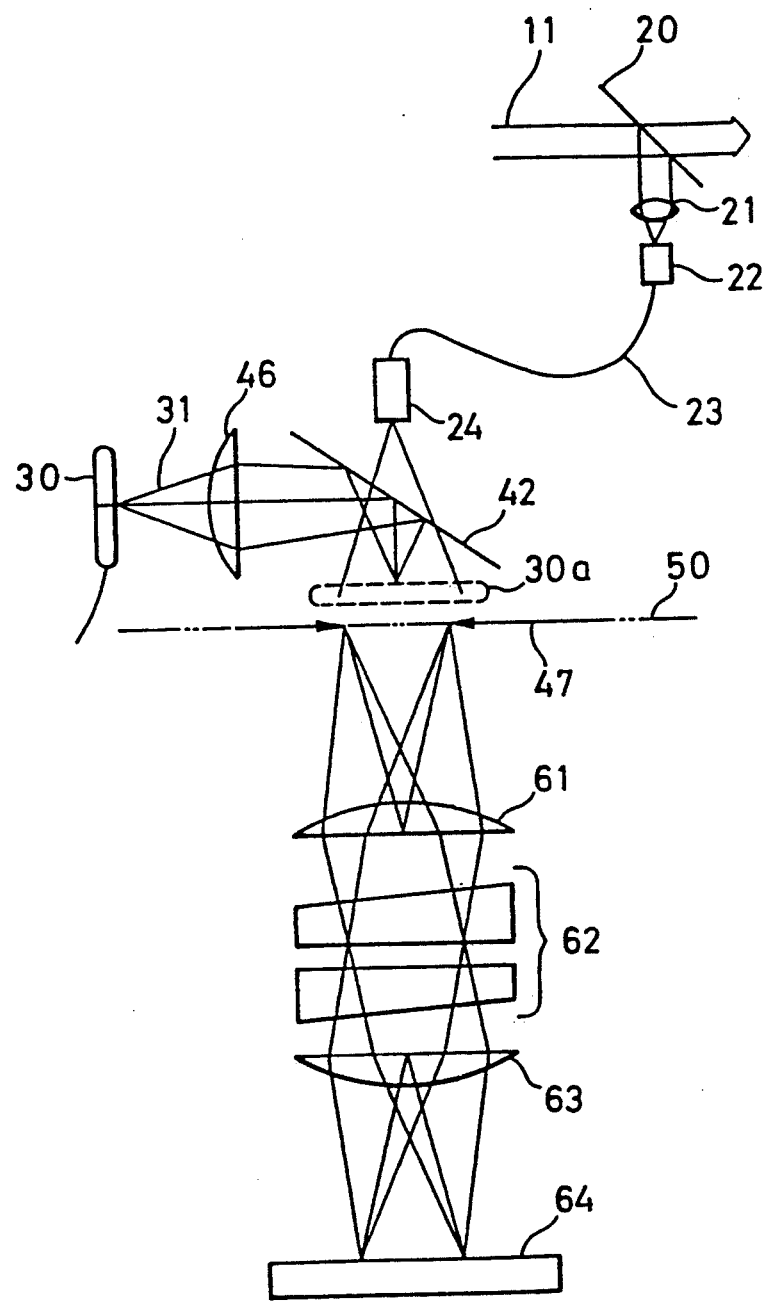
FIG. 5 is an illustrative view which schematically shows the structure of a wavelength detecting apparatus in accordance with another embodiment of the present invention wherein a light scattering plate is arranged on the focusing surface in front of the collimeter lens.

FIG. 5 is an illustrative view which schematically shows the structure of a wavelength detecting apparatus in accordance with another embodiment of the present invention wherein in addition to the construction shown in FIG. 4, a light scattering plate 47 is arranged on the focus surface 50 in front of a collimeter lens 61.

Figure 6:
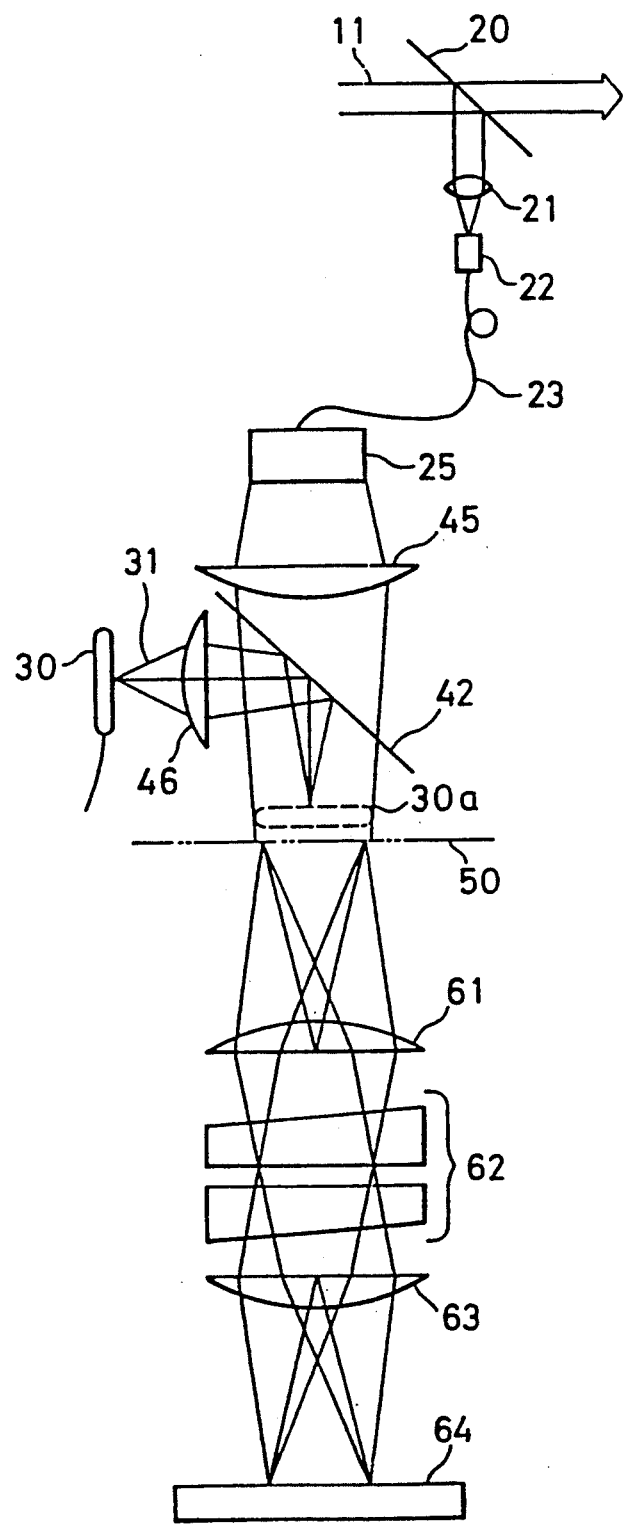
FIG. 6 is an illustrative view which schematically shows the structure of a wavelength detecting apparatus in accordance with another embodiment of the present invention wherein an optical fiber sleeve is arranged at the foremost end of an optical fiber.

FIG. 6 is an illustrative view which schematically shows the structure of a wavelength measuring apparatus in accordance with another embodiment of the present invention wherein the sleeve 24 on the output side of the optical fiber 23 shown in FIG. 4 is substituted for an optical fiber sleeve composed of a number of optical fibers which are arranged in parallel with each other in the multicore-shaped configuration.

It has been found that either of the embodiments shown in FIG. 5 and FIG. 6 provides detection results each having a high accuracy.

Figure 7:
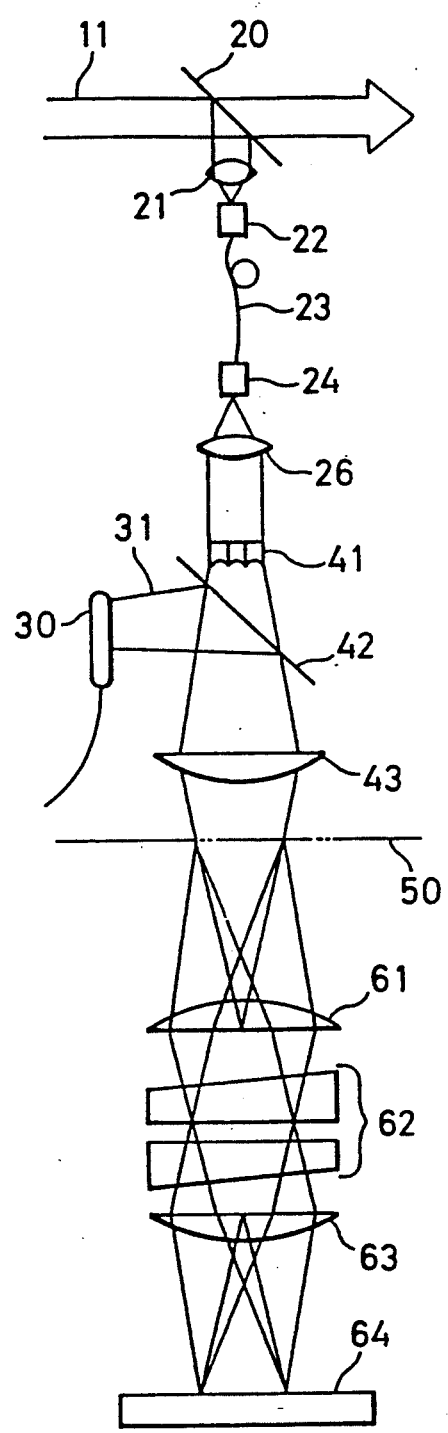
FIG. 7 is an illustrative view which schematically shows the structure of a wavelength detecting apparatus in accordance with another embodiment of the present invention wherein a light to be detected is introduced into an optical detecting system via an optical fiber with an integrator interposed midway of the optical passage for the light to be detected.

FIG. 7 is an illustrative view which schematically shows the structure of a wavelength detecting apparatus in accordance with another embodiment of the present invention wherein the light to be detected is introduced into the optical detecting system via an optical fiber. Referring to FIG. 7, a part of the light to be deflected is deviated sideward of the beam splitter 20 for the purpose of sampling, and the sampling light is then inputted into an optical fiber 23 via a lens 21 and a sleeve 22. Thereafter, the light to be detected which has been transmitted through the optical fiber 23 is outputted via a sleeve 24, whereby the light to be detected is incident on an integrator 41 via a collimeter lens 26. The light which has been outputted from the integrator 41 is irradiated toward the front surface of a beam splitter 42.

On the other hand, the reference light 31 outputted from the light source 30 is irradiated toward the opposite surface of the beam splitter 42.

The beam splitter 42 serves to unite the light to be detected which has been outputted from the integrator 41 with the reference light 31 outputted from the light source 30, and the resultant composite light is irradiated toward the focusing surface 50 in front of a collimeter lens 61. The subsequent operations are same to those as shown and described above with reference to, e.g., FIG. 1.

Figure 8:
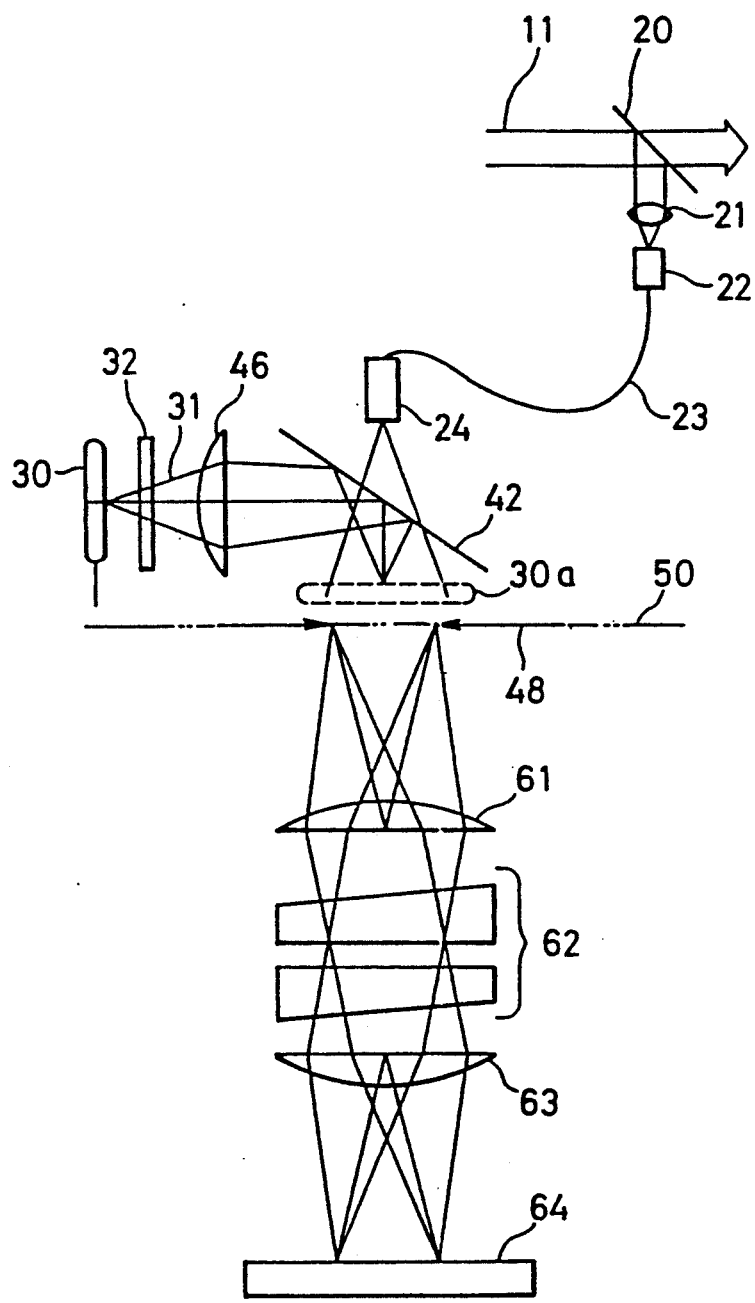
FIG. 8 is an illustrative view which schematically shows the structure of a wavelength detecting apparatus in accordance with further another embodiment of the present invention wherein a filter is employed for a light source for a reference light and an aperture is arranged on the focusing surface in front of the collimeter lens.

Finally, FIG. 8 is an illustrative view which schematically shows the structure of a wavelength detecting apparatus in accordance with further another embodiment of the present invention wherein in addition to the construction shown in FIG. 4, a filter 32 is inserted between the light source 30 for the reference light and the image building lens 46 and moreover an aperture 48 is arranged on the focusing surface 50 in front of a collimeter lens 61.

According to this embodiment, the filter 32 serves to allow only the reference light having a specific wavelength which has been generated and transmitted from the light source 30 to permeate therethrough. For example, in a case where a mercury lamp is employed for the light source 30 for the reference light, the filter 32 permits the light from the mercury lamp having a wavelength of 253.7 nm approximate to the wavelength of an oscillating KrF excimer laser light that is a light to be detected, i.e., 248.4 nm to permeated therethrough. Thus, in the case of this embodiment, only the light having a wavelength of 253.7 nm is irradiated toward the aperture 48 as a reference light. This makes it possible to reduce an occurrence of outside disturbance and moreover detect an absolute wavelength of the light to be detected with a high accuracy. It should be added that the filter 32 may be inserted at other position rather than the foregoing position which is located between the light source 30 for the reference light and the image building lens 46.

According to the embodiments as shown in FIG. 3, FIG. 4, FIG. 5, FIG. 6 and FIG. 8, the image 30a indicative of the light source 30 for the reference light is built by using the image building lens 46. However, the present invention should not be limited to this. Alternatively, a concave mirror may be substituted for the image building lens 46 to build an image indicative of the light source 30a for the reference light. In addition, according to the aforementioned embodiments, the image 30a indicative of the light source 30 for the reference light is built in the region upstream of the focusing surface which is located in front of the collimeter lens 61. Alternatively, the image 30a indicative of the light source 30 for the reference light may be built on the focusing surface in front of the collimeter lens 61.

Additionally, with respect to the construction as shown in FIG. 1, FIG. 2, FIG. 3, FIG. 6 and FIG. 7, a light scattering plate or an aperture may additionally be arranged on the focusing surface which is located in front of the collimeter lens 61.

Further, according to the aforementioned embodiments, the wavelength detecting apparatus is provided with an air gap type etalon. Alternatively, a solid type etalon may be substituted for the air gap type etalon with the same functional effects as mentioned above.

INDUSTRIAL APPLICABILITY

According to the present invention, interference fringes each having a sufficiently high intensity can be formed on incidence of both lights, i.e., a reference light and a light to be detected, whereby an absolute wavelength of the light to be detected can be detected with a high accuracy. In addition, according to the present invention, since the reference light and the light to be detected are adapted to illuminate the focusing surface only which is located in front of a collimeter lens, there is no need of aligning their optical axes with each other with a high accuracy. The wavelength detecting apparatus of the present invention is preferably employable for detecting a wavelength especially in the case where an excimer laser light unit is used as a light source for an equipment for projecting and exposing an image in a reduced scale wherein the equipment is installed for producing semiconductor devices.

We claim:

1. A wavelength detecting apparatus for detecting the wavelength of a first light from a first light source with reference to reference light from a reference light source by allowing said reference light and said first light to be irradiated toward an etalon and then detecting the light which has permeated through said etalon by optical detecting means, wherein said apparatus comprises:

a focal plane toward which said first light an said reference light are irradiated, collimeter lens means in an optical path between said etalon and said focal plane arranged at a preceding stage relative to said etalon for transforming the light which has been irradiated toward said focal plane into parallel light, optical path means between said focal plane and said first light source and said reference light source for guiding said reference light and said first light to said focal plane, and image building means arranged at a subsequent stage relative to the etalon to receive light from said etalon and for guiding light which has permeated through said etalon onto a detecting surface of said optical detecting means.

2. The wavelength detecting apparatus as claimed in claim 1, wherein said optical path means comprises:

an integrator for allowing said first light to be incident thereon, a beam splitter for receiving light from said integrator to unite the first light with reference light transmitted from said reference light source and for combining said first light and said reference light and outputting the resulting composite light; and a condenser lens for receiving the composite light derived from said beam splitter and guiding said composite light to said focal plane in front of said collimeter lens.

3. The wavelength detecting apparatus as claimed in claim 1, wherein said optical path means comprises:

a light collecting lens for collecting said first light, and a beam splitter for uniting said reference light and light outputted from said light collecting lens so as to illuminate said focal plane in front of the collimator lens with composite light.

4. The wavelength detecting apparatus as claimed in claim 1, wherein said optical path means comprises;

an integrator for allowing said first light to be incident thereon, a light collecting lens arranged for collecting light outputted from the integrator and for illuminating said focal plane in front of the collimeter lens with the collected light, a beam splitter arranged in the optical path for the light outputted from said light collecting lens, and an image building lens arranged between said reference light source and said beam splitter so as to focus the image of said reference light source on said focal plane in front of the collimeter lens or in the region upstream of said focal plane via the beam splitter.

5. The wavelength detecting apparatus as claimed in claim 1, wherein said illuminating means comprises:

an optical fiber through which said first light is introduced so as to illuminate said focal plane in front of the collimeter lens with said first light, a beam splitter arranged in the optical path for the light outputted from said optical fiber, and an image building system arranged to receive light from said reference light source and guide said light from said reference light source to said focal plane in front of the collimeter lens or in the region upstream of the focusing surface via the beam splitter.

6. The wavelength detecting apparatus as claimed in claim 1, wherein said optical path means comprises;

an optical fiber through which first light is guided, an optical fiber sleeve arranged to receive said guided first light and output said first light, a light collecting lens for collecting the first light outputted from said optical fiber sleeve and guide said first light to said focal plane in front of the collimeter lens, a beam splitter arranged in the optical path for the light outputted from said light collecting lens, and an image building system arranged between the beam splitter and said reference light source so as to allow the image indicative of the reference light source to be built on said focal plane in front of the collimeter lens or in the region upstream of the focusing surface via said beam splitter.

7. The wavelength detecting apparatus as claimed in claim 1, wherein said optical path means comprises;

an optical fiber through which said first light to be detected is guided, a collimeter lens for transforming into a parallel light the first light outputted from said optical fiber, an integrator for receiving light outputted from said collimeter lens, a beam splitter arranged to receive light from said integrator and to unite said first light and the reference light generated and transmitted from the reference light source for the reference light and the light outputted from the integrator with each other, and a condenser lens for receiving composite light from the beam splitter and guiding said composite light to said focal plane in front of the collimeter lens.

8. The wavelength detecting apparatus as claimed in claim 1 further including a light scattering plate which is arranged at said focal plane in front of the collimeter lens.

9. The wavelength detecting apparatus as claimed in claim 1 further including an aperture which is arranged at said focal plane in front of the collimeter lens.

10. The wavelength detecting apparatus as claimed in claim 1, wherein said reference light source comprises:

a lamp, and a filter for selectively filtering light from said lamp such that only light having a predetermined wavelength passes therethrough.

11. The wavelength detecting apparatus as claimed in claim 1, wherein said reference light source comprises a plane light source.

12. The wavelength detecting apparatus as claimed in claim 1, wherein a filter for selectively passing therethrough only light having a predetermined wavelength is located on the optical path for said light which has been generated and transmitted from said reference light source.

* * * * *